United States Patent
Weber et al.

(10) Patent No.: US 11,726,588 B2
(45) Date of Patent: Aug. 15, 2023

(54) LAMINATED GLASS PANE AND METHOD FOR PRODUCTION THEREOF

(71) Applicant: SAINT-GOBAIN GLASS FRANCE, Courbevoie (FR)

(72) Inventors: Patrick Weber, Alsdorf (DE); Bastian Klauss, Aachen (DE); Michael Zeiss, Herzogenrath (DE); Christian Effertz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 387 days.

(21) Appl. No.: 16/616,326

(22) PCT Filed: Mar. 14, 2018

(86) PCT No.: PCT/EP2018/056373
§ 371 (c)(1),
(2) Date: Nov. 22, 2019

(87) PCT Pub. No.: WO2018/215106
PCT Pub. Date: Nov. 29, 2018

(65) Prior Publication Data
US 2020/0156351 A1 May 21, 2020

(30) Foreign Application Priority Data
May 24, 2017 (EP) .................................. 17172764

(51) Int. Cl.
*B32B 17/10* (2006.01)
*G06F 3/041* (2006.01)

(52) U.S. Cl.
CPC .......... *G06F 3/041* (2013.01); *B32B 17/1022* (2013.01); *B32B 17/10036* (2013.01); *B32B 17/10293* (2013.01); *B32B 17/10348* (2013.01); *B32B 17/10761* (2013.01); *B32B 17/1077* (2013.01); *B32B 17/10174* (2013.01); *B32B 17/10788* (2013.01); *B32B 2315/08* (2013.01); *B32B 2329/06* (2013.01); *B32B 2605/08* (2013.01)

(58) Field of Classification Search
CPC .......... B32B 17/10036; B32B 17/1022; B32B 17/10293; B32B 17/10348;
(Continued)

(56) References Cited

U.S. PATENT DOCUMENTS

| 6,094,981 A * | 8/2000 | Hochstein ......... B32B 17/10036 73/170.17 |
| 2008/0212101 A1* | 9/2008 | Wolf ....................... B60S 1/084 356/445 |

(Continued)

FOREIGN PATENT DOCUMENTS

| DE | 10 2004 054465 A1 | 5/2006 |
| JP | 2015527948 | 9/2015 |

(Continued)

OTHER PUBLICATIONS

International Search Report as issued in International Patent Application No. PCT/EP2018/056373, dated Apr. 10, 2018.

*Primary Examiner* — Tahseen Khan
(74) *Attorney, Agent, or Firm* — Pillsbury Winthrop Shaw Pittman LLP

(57) ABSTRACT

A laminated glass pane having a first glass layer and a second glass layer, wherein at least one first electrically conducting structure and a second electrically conducting structure are arranged between the first glass layer and the second glass layer, wherein the first electrically conducting structure and the second electrically conducting structure are arranged spaced apart from one another, wherein the first electrically conducting structure at least partially overlaps the second electrically conducting structure in a perpendicular orientation relative to the first glass layer, wherein the first electrically conducting structure is associated with a first electrical element, wherein the first electrical element is a capacitive sensor.

13 Claims, 3 Drawing Sheets

(58) Field of Classification Search
CPC ........ B32B 17/10761; B32B 17/10174; B32B 2315/08; B32B 2329/06; B32B 2605/08; B32B 2605/006; Y10T 428/24802; Y10T 428/24851; Y10T 428/24917; Y10T 428/24926; Y10T 428/24942; Y10T 428/2495
USPC ............. 428/195.1, 201, 209, 210, 212, 213
See application file for complete search history.

(56) References Cited

U.S. PATENT DOCUMENTS

| | | | |
|---|---|---|---|
| 2010/0179725 A1* | 7/2010 | Boote | H03K 17/962 200/600 |
| 2015/0165965 A1* | 6/2015 | Masaki | B32B 17/10532 362/513 |
| 2016/0179244 A1* | 6/2016 | Keller | H03K 3/0315 345/174 |
| 2016/0325529 A1* | 11/2016 | Linthout | B60Q 3/208 |
| 2017/0041987 A1* | 2/2017 | Weber | B32B 17/10192 |
| 2017/0232713 A1* | 8/2017 | Mannheim Astete | B32B 17/10788 428/172 |

FOREIGN PATENT DOCUMENTS

| KR | 1020150031283 | 3/2015 |
|---|---|---|
| WO | WO 2013/053611 A1 | 4/2013 |
| WO | WO 2015/162107 A1 | 10/2015 |

\* cited by examiner

LAMINATED GLASS PANE AND METHOD FOR PRODUCTION THEREOF

CROSS-REFERENCE TO RELATED APPLICATIONS

This application is the U.S. National Stage of PCT/EP2018/056373, filed Mar. 14, 2018, which in turn claims priority to European patent application number 17 172.764.7, filed May 24, 2017. The content of these applications are incorporated herein by reference in their entireties.

The invention relates to a laminated glass pane and a method for production thereof.

BACKGROUND OF THE INVENTION

In the automotive engineering sector, a large number of panes are used. There is an increasing desire to integrate different functions into the panes.

Thus, for example, attempts are increasingly made to integrate electrical elements, in particular sensors, e.g., rain sensors, lighting sensors, distance sensors, etc., and controls, such as, touch switches/proximity switches and display elements into the panes.

From international patent application WO 2015/162 107 A1, a glass panel with an illuminated switching surface and heating function is known, for example.

Also, from international patent application WO 2013/053 611 A1, a glass pane with an electrochromic coating and a sensor is known.

In addition, from DE 10 2004 054 465 A1, an optical moisture sensor for detecting moisture on the outer side and/or the inner side of a glass pane is known. In order to be able to arrange the optical moisture sensor even in a wiper-cleaned wiper field of a windshield, a transparent transmitter or receiver is provided.

However, with an increasing number of such sensors, their placement is becoming increasingly difficult. Among the reasons for this is the fact that sensors result in interference with the optical properties of the glass pane.

It should also be noted that laterally adjacent sensors can mutually influence each other. Based on this experience, there is an effort to provide a sufficiently large distance between sensors. There is, nevertheless, a need for placing sensors without the previous restrictions.

BRIEF DESCRIPTION OF THE INVENTION

The object is accomplished by a laminated glass pane having a first glass layer and a second glass layer, wherein at least one first electrically conducting structure and a second electrically conducting structure are arranged between the first glass layer and the second glass layer, wherein the first electrically conducting structure and the second electrically conducting structure are arranged spaced apart from one another, wherein the first electrically conducting structure at least partially overlaps the second electrically conducting structure in a perpendicular orientation relative to the first glass layer, wherein the first electrically conducting structure is associated with a first electrical element, wherein the first electrical element is a capacitive sensor.

The laminated glass pane according to the invention creates a possibility of avoiding the previous restrictions.

In one embodiment of the invention, the second electrically conducting layer is associated with a second electrical element, in particular an optoelectronic component, a sensor, or a near-field communication circuit or an antenna.

In other words, with different elements, a large number of different functions can be provided. In another embodiment of the invention, the laminated glass pane has a black print at least partially at the location of the first electrically conducting structure.

In other words, at least parts of the electrically conducting structure can be optically hidden. According to another embodiment of the invention, the laminated glass pane further has at least one combination film between the first glass layer and the second glass layer, wherein the combination film contains at at least one material selected from the group comprising polybutylene terephthalate (PBT), polycarbonate (PC), polyethylene terephthalate (PET) and polyethylene naphthalate (PEN), polyvinyl chloride (PVC), polyvinyl fluorides (PVF), polyvinyl butyral (PVB), ethylene vinyl acetate (EVA), polyacrylate (PA), polymethyl methacrylate (PMMA), polyurethane (PUR), and/or mixtures and copolymers thereof.

In other words, the invention allows versatile adaptation to different optical and mechanical conditions.

According to yet another embodiment of the invention, the laminated glass pane further has an electrical connection to the first electrically conducting layer and/or the second electrically conducting layer, with the connection arranged through one of the glass layers or at the edge of the glass layers.

Thus, the invention allows a free design of the sensors and their connections, making a large number of degrees of freedom available for the design.

In yet another embodiment of the invention, the first electrically conducting structure and the second electrically conducting structure are arranged on at least one inlet.

Thus, the electrically conducting structures can be produced economically in advance and incorporated into the manufacturing process. With the arrangement on at least one inlet, both one-sided and two-sided structured inlets can be used.

According to yet another embodiment of the invention, the first electrically conducting structure and the second electrically conducting structure are arranged on at least one inlet, with the at least one inlet (15, 25) having polyethylene terephthalate.

Thus, production can be done within typical combinations of materials.

In another embodiment of the invention, the first electrically conducting structure and the second electrically conducting structure are arranged on an inlet, wherein the inlet has a folded film.

Single-sided structured inlets can be produced particularly economically, with the inlet having both structures on one side. Before insertion, the inlet is folded such that the electrical structures are arranged on the outside.

In yet another embodiment of the invention, the first electrically conducting structure is arranged on the first glass layer and the second electrically conducting structure is arranged on the second glass layer.

In this case as well, production is economical since now both glass layers can be produced separately one-sided with the respective structure.

According to yet another embodiment of the invention, the laminated glass pane according to the invention can be used in vehicles or buildings or in an information display.

In other words, the range of applications is quite large such that the laminated glass pane according to the invention can be produced economically.

In another embodiment of the invention, a method for producing a laminated glass pane is provided. The method has a step of obtaining a first glass layer and a second glass layer, the step of obtaining a first inlet film having a first electrical structure and a second inlet film having a second electrical structure. The method further has the step of arranging the first inlet film relative to the first glass layer such that the first electrical structure is closer to the first glass layer. The method further has the step of arranging the second inlet film relative to the first glass layer such that the second electrical structure is closer to the second glass layer. The method further has the step of bonding the arranged layers under the influence of heat.

In another embodiment of the invention, another method for producing a laminated glass pane is provided. The method has a step of obtaining a first glass layer and a second glass layer, and the step of obtaining an inlet film having a first electrical structure and a second electrical structure. The method has a step of folding the inlet film such that the first electrical structure and the second electrical structure overlap at least partially. In another step, the inlet film is arranged relative to the first glass layer such that the first electrical structure is closer to the first glass layer and the second electrical structure is closer to the second glass layer. The method further has the step of bonding the arranged layers under the influence of heat.

In another embodiment of the invention, yet another method for producing a laminated glass pane is provided. The method has a step of obtaining a first glass layer and a second glass layer and the step of structuring a first electrical structure on the first glass layer and a second electrical structure on the second glass layer. The method has a step of arranging the first glass layer such that the first electrical structure is closer to the first glass layer and the second electrical structure is closer to the second glass layer. The method further has the step of bonding the arranged layers under the influence of heat.

In one embodiment of the method according to the invention, a step of arranging at least one combination film between the first glass layer and the second glass layer is further provided, before the arranged layers are bonded under the influence of heat.

With the methods presented, production can be particularly economical and simple, while, at the same time, creative latitude in the placement of the electrical elements is not restricted.

BRIEF DESCRIPTION OF THE DRAWINGS

Embodiments of the present invention are described by way of example with reference to the appended drawings, which depict.

DETAILED DESCRIPTION OF THE INVENTION WITH REFERENCE TO THE DRAWINGS

In the following, the invention is presented in greater detail with reference to the figures. It should be noted that different aspects are described that can, in each case, be used individually or in combination. In other words, any aspect can be used with different embodiments of the invention unless explicitly presented as a pure alternative.

Furthermore, for the sake of simplicity, usually only one entity is referenced in the following. Unless explicitly stated, the invention can also include, however, in each case, a plurality of the entities concerned. Thus, the use of the words "a" and "an" is to be understood only as an indication that at least one entity is used in a simple embodiment.

In the methods described in the following, individual steps can be incorporated into a single step and, for example, executed in parallel. In addition, the order of steps can vary such that the presented order of steps must not be considered mandatory, unless a certain order is described as explicitly necessary.

Furthermore, mixed application of the methods is also possible.

Figure 1:
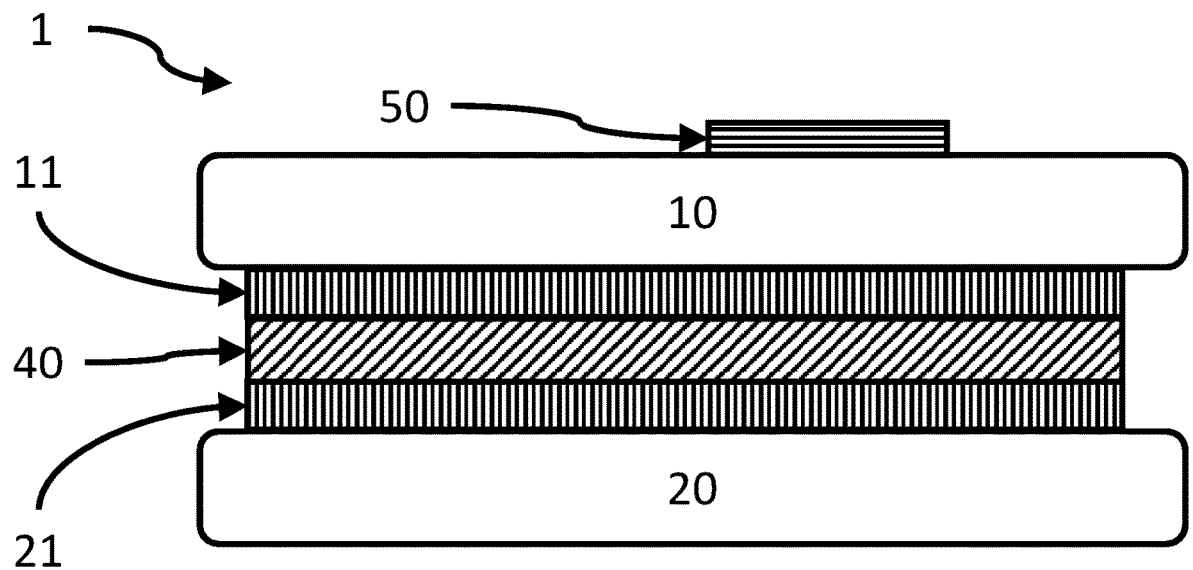
FIG. 1 a schematic sectional representation of a laminated glass pane according to the invention in accordance with methods according to the invention, FIG. 2 a schematic sectional representation of a laminated glass pane according to the invention in accordance with other methods according to the invention, FIG. 3 a schematic sectional representation of a detail of the invention, FIG. 4 a schematic sectional representation another detail of the invention, and FIG. 5 a flowchart with steps in accordance with methods according to the invention.
Figure 2:
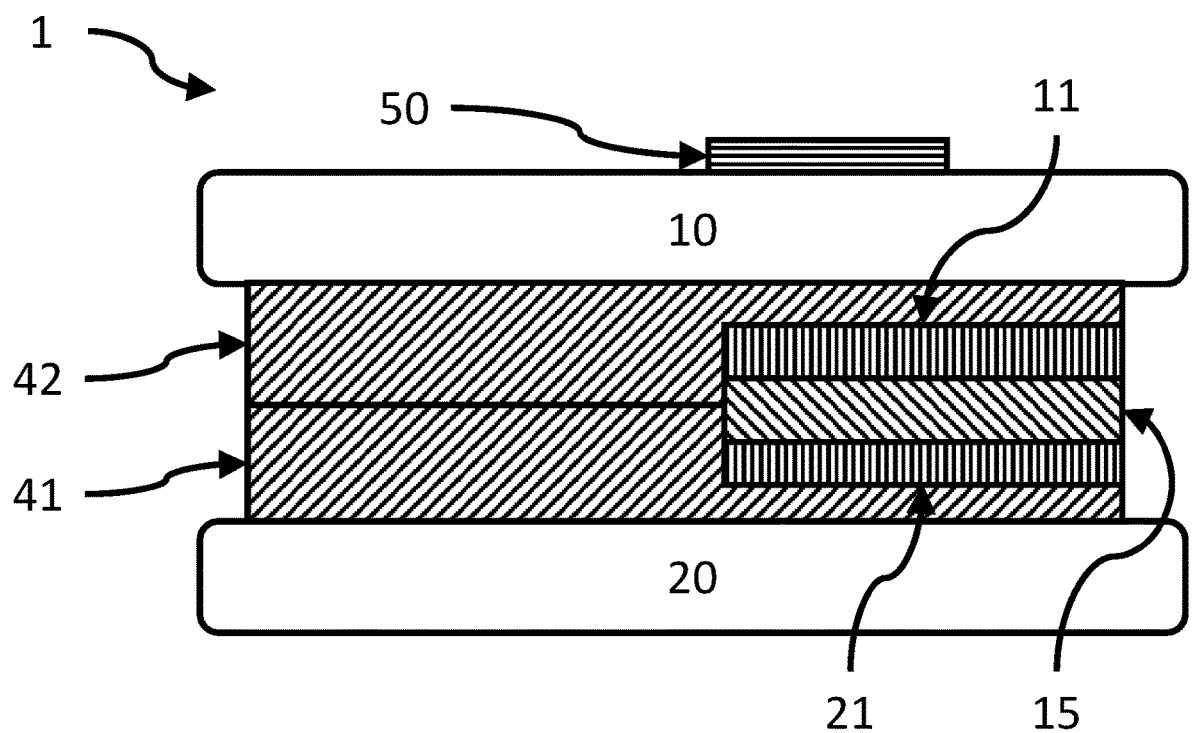

FIGS. 1 and 2 depict in each case a laminated glass pane 1 according to the invention in accordance with alternative or combinable embodiments. The laminated glass pane 1 has a first glass layer 10 and a second glass layer 20.

At least one first electrically conducting structure 11 and one second electrically conducting structure 21 are arranged between the first glass layer 10 and the second glass layer 20.

Here, the first electrically conducting structure 11 and the second electrically conducting structure 21 are arranged spaced apart from one another, with the first electrically conducting structure 11 at least partially overlapping the second electrically conducting layer in a normal/perpendicular orientation relative to the first glass layer 10.

In other words, in FIG. 1, the first electrically conducting structure 11 is arranged either on the first glass layer 10 or on one side of a combination film 40; whereas the second electrically conducting structure 21 is arranged either on the second glass layer 20 or on a different side of the combination film 40. Of course, two combination films with respective one-sided structures could also be provided, as is explained later in connection with FIG. 3 using the example of one inlet 15. Thus, the two structures are spaced apart from one another at least by the combination film 40.

In contrast, in FIG. 2, the first electrically conducting structure 11 and the second electrically conducting structure 21 are spaced apart from one another by the inlet 15.

Here, the first electrically conducting layer 11 is associated with a first electrical element. The first electrical element is, for example, a capacitive sensor, such as a rain sensor or a touch sensor.

Here, the invention makes use of the knowledge that an electrical influence occurs substantially at the edge regions of the respective electrical structures, whereas shielding effects are stronger with an at least partial overlap of the structure regions. Thus, different structures can be arranged overlapping, with the overlap yielding expedient decoupling. This can, for example, be used for improved switching behavior or for increased sensitivity. In addition, the overlapping arrangement permits a reduction of optically disturbed areas with simultaneous enlargement of the total areas usable for vision and for electrical structures. The laminated glass pane according to the invention creates a possibility of avoiding the previous restrictions.

In one embodiment of the invention, the second electrically conducting layer 21 is associated with a second electrical element, in particular an optoelectronic component, e.g., a light-emitting diode, a sensor, or a near-field communication circuit or an antenna.

In other words, with different electrical elements, a large number of different functions can be provided, e.g., sensor systems and/or displays.

In one embodiment of the invention, the laminated glass pane 1 has a black print 50 at least partially at the location of the first electrically conducting structure 11.

In other words, at least parts of the electrically conducting structure can be optically hidden. In another embodiment of the invention, the laminated glass pane 1 further has at least one combination film 40; 41, 42 between the first glass layer 10 and the second glass layer 20. For example, in the embodiment of FIG. 1, a combination film 40 is depicted; and in the embodiment of FIG. 2, two combination films 41 and 42 are depicted. Here, the laminated glass panes according to the invention are not limited to one or two combination films; instead, any number of combination films can be introduced. Each combination film can also have other functionalities, such as antireflection coatings, etc.

The combination films 40, 41, 42 contain at at least one material selected from the group comprising polybutylene terephthalate (PBT), polycarbonate (PC), polyethylene terephthalate (PET) and polyethylene naphthalate (PEN), polyvinyl chloride (PVC), polyvinyl fluorides (PVF), polyvinyl butyral (PVB), ethylene vinyl acetate (EVA), polyacrylate (PA), polymethyl methacrylate (PMMA), polyurethane (PUR), and/or mixtures and copolymers thereof.

In other words, the invention allows versatile adaptation to different optical and mechanical conditions.

Furthermore, in embodiments of the invention, an electrical connection to the first electrically conducting layer 11 and/or the second electrically conducting layer 21 can be made available, wherein the connection is arranged through one of the glass layers 10, 20 or at the edge of the glass layers 10, 20.

Thus, the invention allows a free design of the sensors and their connections, making a large number of degrees of freedom available for the design.

For example, the first electrical element can be a rain sensor and the second electrical element can be a touch sensor/proximity sensor or a status display.

In one embodiment, which will be described in more detail in connection with FIGS. 2-4, the first electrically conducting structure 11 and the second electrically conducting structure 21 are arranged on at least one inlet 15, 25. The inlet thus forms another layer.

The inlet 15, 25 can, for example, be a suitably dimensioned strip that is embedded between the glass layers 10, 20 and—if present, also between two combination films 41, 42. The spatial extension can be less than the spatial extension of the glass layers 10, 20, as depicted, for example, in FIG. 2. Providing suitable electrical structures on an inlet 15 instead of on a combination film 40 permits the production of the electrical structures in large quantities and their flexible incorporation.

The electrically conducting structures can, as indicated in FIG. 2, be arranged on both sides of an inlet 15. However, it is also possible to make available a comparable arrangement by folding an inlet 15—as depicted in FIG. 3—or by two separate inlets, inlet 15 with the first electrically conducting structure 11 and inlet 25 with the second electrically conducting structure 21, which are combined such that the first electrically conducting structure 11 and the second electrically conducting structure 21 face outward.

The inlet 15 or the inlets 15, 25 have, for example, polyethylene terephthalate. Other materials, in particular the materials of the combination film 40, 41, 42, can, however, also be used as a carrier material for the first electrically conducting structure 11 or the second electrically conducting structure 21.

According to yet another embodiment of the invention, the laminated glass pane according to the invention can be used in vehicles or buildings or as an information display. In other words, the range of applications is quite large such that the laminated glass pane according to the invention can be produced economically.

In the following, methods are outlined with which the basic functionality of the laminated glass pane 1—as described above—can be produced. The methods differ depending on where certain electrical elements are arranged. However, it should again be pointed out that the individual methods do not exclude mixed forms thereof. Mixed forms are possible both in the vertical orientation and in the horizontal orientation. For example, it can be argued in favor of mixed forms that certain functions can be produced more precisely and/or economically with one method, whereas other functions can be produced more economically and/or more precisely with a different method. In other words, the person skilled in the art is given all degrees of freedom of design, and one method does not exclude another method.

Figure 5:
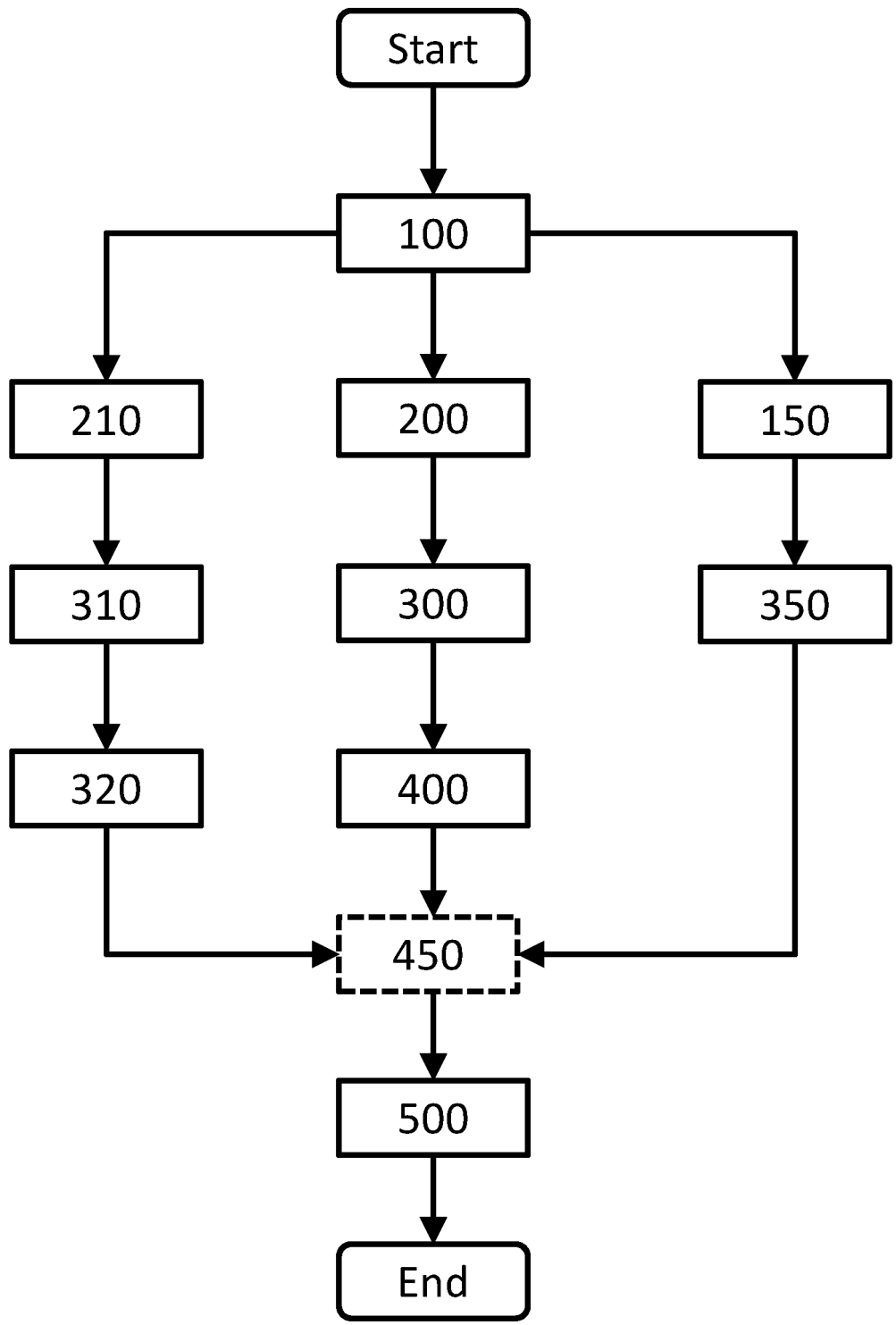

The methods are presented in a common flowchart in accordance with FIG. 5.

In a first step 100, which is common to all methods, the first glass layer 10 and the second glass layer 20 are obtained.

In the following, the methods differ in the way certain functions are arranged.

Figure 4:
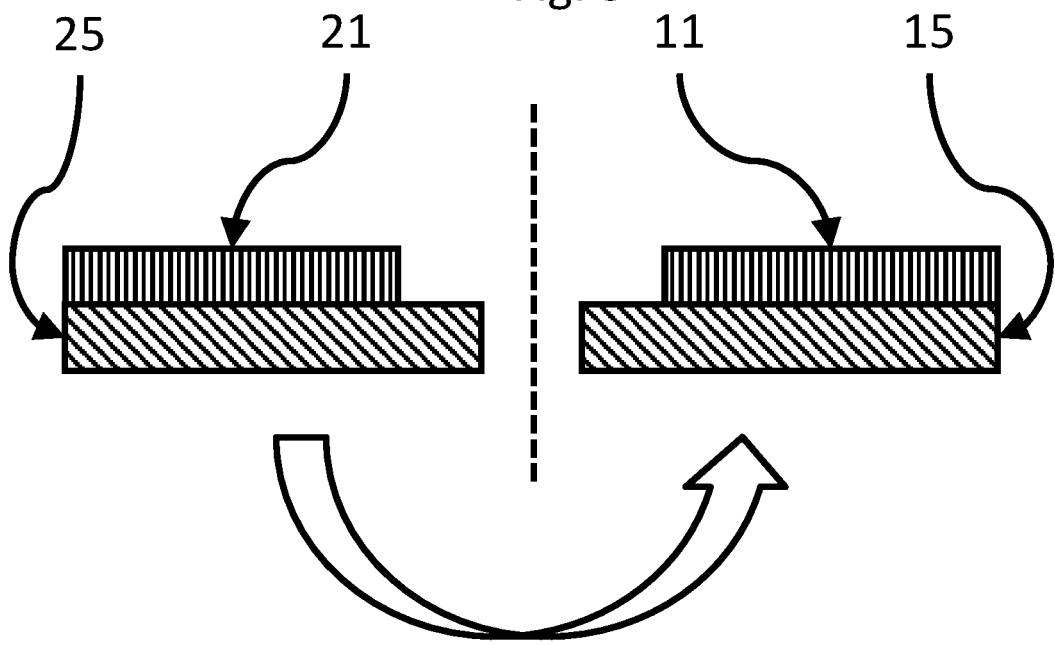

In the first case, it is assumed that the first electrical structure 11 is arranged on a first inlet film 15 and the second electrical structure 21 is arranged on a second inlet film 25, as depicted, for example, in FIG. 4.

Then, initially, the first inlet film 15 with the first electrical structure 11 and the second inlet film 25 with the second electrical structure 21 are obtained in step 200. Then, in step 300, the first inlet film 15 is arranged relative to the first glass layer 10 such that the first electrical structure 11 is closer to the first glass layer 10. In a step 400, the second inlet film 25 is arranged relative to the first glass layer 20 such that the second electrical structure 21 is closer to the second glass layer 20. The arranging in steps 300 and 400 can, for example, include placement, wherein the order of the steps 300 and 400 is dictated by the layer sequence. Alternatively, it is, of course, also possible to combine the steps 300 and 400 and, for example, to arrange the two inlets 15 and 25 relative to one another in a first step and, optionally, to pre-bond them and then to place them on the corresponding glass layer 20 or combination film 41 in the corresponding orientation.

Figure 3:
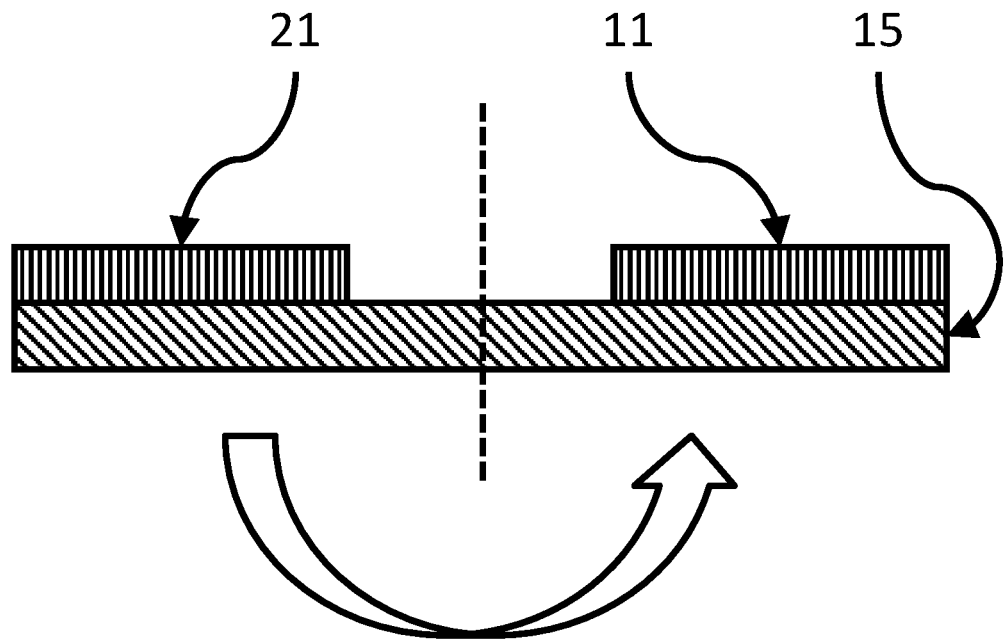

In the second case, it is assumed that the first electrical structure 11 and the second electrical structure 21 are arranged on an inlet film 15, as depicted, for example, in FIG. 3.

Then, initially, in step 210, the inlet film 15 having a first electrical structure 11 and a second electrical structure 12 is obtained. Then, the inlet film 15 is folded at a suitable location—indicated in FIG. 3 by the dashed line—in a step 310 such that the first electrical structure 11 and the second electrical structure 21 overlap at least partially. The step of the folding 310 can, of course, also be done earlier such that a pre-folded and, optionally, pre-bonded inlet 15 is obtained for production. In a step 320, the folded inlet film 15 is arranged relative to the first glass layer 10 such that the first electrical structure 11 is closer to the first glass layer 10 and the second electrical structure 21 is closer to the second glass layer 20. It should be noted that the step 320 of arranging can also be executed combined with the step of folding 310. The arranging in step 320 can, for example, include placement.

In a third case, it is assumed that the first electrical structure 11 is arranged on the first glass layer 10 and the second electrical structure 21 is arranged on the second glass layer 20, as depicted, for example, in FIG. 1.

Then, initially, in a step 150, the first electrical structure 11 is structured on the first glass layer 10 and the second electrical structure 21 is structured on the second glass layer 20. For this, suitable printing methods, etching methods, mechanical ablation, laser ablation, etc., can be used. The step 150 can also be suitably arranged temporally prior to step 100. In a step 350, the first glass layer 10 and the second glass layer 20 are then arranged such that the first electrical structure 11 and the second electrical structure 21 are arranged "inside".

In another step 500, which, again, is common to all methods, the arranged layers are bonded under the influence of heat.

In an optional step 450, which must be arranged temporally prior to step 500, and which can also be part of steps 300, 400, 320, 350, at least one combination film 40; 41; 42 is arranged between the first glass layer 10 and the second glass layer 20.

The combination film 40, 41, 42 serve, on the one hand, for bonding; on the other, the combination films can also assume other functions, such as for example, an insulation function (e.g., between the first and the second electrically conducting structure 11 or 21) or carrier functions for other functional layers.

With the laminated glass panes 1 presented and their method of production, it is, in particular, possible to provide both a rain sensor and a touch sensor/proximity sensor, with the rain sensor provided by the second electrically conducting structure 21 and measuring in the direction of the second glass layer 20, whereas the touch sensor/proximity sensor is provided by the first electrically conducting structure 11 and measures in the direction of the first glass layer 10. In other words, different functions can be realized at the same location with a reduced material outlay and, optionally, common connections.

Here, for example, the electrical structures 11, 21 can be made available on suitable inlets 15, 25, and can, as needed, be integrated into the production process.

The space requirement is reduced by the at least partial overlapping of the sensors.

With the embodiments presented, it is possible to place the electrical structures 11 21 for sensors, for example, close to the glass layers 10, 20. Such a placement has, for (capacitive) sensors such as touch sensors/rain sensors, the advantage of an improvement of the asymmetric effect. Furthermore, the respective other electrical structure provides a shielding effect such that, for example, operation of a touch sensor/proximity sensor is possible only from the respective desired glass layer.

Without loss of generality, the electrical structures 11 and 21 can be controlled and evaluated by a common evaluation electronics system that can also be arranged on an inlet 15, 25.

In addition, it is possible to place at least parts of the electrical structures 11, 21 such that they are arranged under a black print 50. With vehicle windows, such a black print is often found in the edge region. Optical interference can be avoided by at least partial arrangement under the black print 50. Obviously, this is not reasonable for all functions.

It has also been demonstrated that similarly shaped sections of the first electrical structure 11 and the second electrical structure 21 result in a further reduction of optical interference when they are arranged almost one above another.

In particular, it is possible, for example, by means of suitable (e.g., alternating) activation of the first and second electrical structures 11, 21, for example, for one electrical structure to provide a shielding ground potential, while the other electrical structure provides a different potential to be measured. Thus, for example, it is possible to switch between a rain sensor and a touch sensor, which are intended to measure on different sides of the glass layers 10, 20, wherein, in each case, high sensitivity can be suppressed with simultaneous shielding against incorrect measurements (capacitive changes on the side not to be measured in each case). Without loss of generality, the electrical structures 11, 21 can also be used for other functions, such as (mobile telephony, broadcast radio, GPS) antennas, lighting, heating, wherein, in particular, spatial combinations of switching and display elements can also be advantageously combined.

LIST OF REFERENCE CHARACTERS

1 laminated glass pane
10 first glass layer
11 first electrically conducting structure
15, 25 inlet
20 second glass layer
21 second electrically conducting structure
40, 41, 42 combination film
50 black print

STEPS

100 Obtaining a first glass layer and a second glass layer
200 Obtaining a first inlet film and a second inlet film
300 Arranging the first inlet film
400 Arranging the second inlet film
500 Bonding the arranged layers
210 Obtaining an inlet film
310 Folding the inlet film
320 Arranging the inlet film
150 Structuring a first electrical structure and a second electrical structure
300 Arranging the first glass layer and the second glass layer
450 Arranging at least one combination film

The invention claimed is:

1. Laminated glass pane having a first glass layer and a second glass layer, wherein at least one first electrically conducting structure and a second electrically conducting structure are arranged between the first glass layer and the second glass layer, wherein the first electrically conducting structure and the second electrically conducting structure are arranged spaced apart from one another along a direction perpendicular to a main surface of the first glass layer, with the first electrically conducting structure being arranged in a first plane and the second electrically conducting structure being arranged in a second plane different from the first plane, wherein the first electrically conducting structure at least partially overlaps the second electrically conducting structure in a perpendicular orientation relative to the first glass layer, wherein the first electrically conducting structure constitutes a first electrical element and the second electrically conducting structure constitutes a second electrical element, wherein the first electrical element and the second electrical element are each a capacitive sensor, wherein one of the first electrically conducting structure and the second electrically conducting structure provides a ground potential and the other one of the first electrically conducting structure and the second electrically conducting structure provides a different potential to be measured, and wherein the first electrically conducting structure and the second electrically conducting structure are arranged on at least one inlet, with the first electrically conducting structure being arranged on one side of the inlet and the second electrically conducting structure being arranged on an opposite side of the inlet.

2. The laminated glass pane according to claim 1, wherein the first electrical element is a touch sensor or a proximity sensor, and the second electrical element is a rain sensor.

3. The laminated glass pane according to claim 1, wherein the laminated glass pane has a black print at least partially at a location of the first electrically conducting structure.

4. The laminated glass pane according to claim 1, wherein the laminated glass pane further has at least one combination film between the first glass layer and the second glass layer, wherein the at least one combination film contains at least one material selected from the group consisting of polybutylene terephthalate (PBT), polycarbonate (PC), polyethylene terephthalate (PET) and polyethylene naphthalate (PEN), polyvinyl chloride (PVC), polyvinyl fluorides (PVF), polyvinyl butyral (PVB), ethylene vinyl acetate (EVA), polyacrylate (PA), polymethyl methacrylate (PMMA), polyurethane (PUR), and/or mixtures and copolymers thereof.

5. The laminated glass pane according to claim 1, wherein the laminated glass pane further has an electrical connection to the first electrically conducting structure and/or the second electrically conducting structure, wherein the electrical connection is arranged through one of the first and second glass layers or at the edge of the first and second glass layers.

6. The laminated glass pane according to claim 1, wherein the first electrically conducting structure and the second electrically conducting structure are arranged on at least one inlet, wherein the at least one inlet has polyethylene terephthalate.

7. The laminated glass pane according to claim 1, wherein the inlet has a folded film.

8. The laminated glass pane according to claim 1, wherein the first electrically conducting structure is arranged on the first glass layer and the second electrically conducting structure is arranged on the second glass layer.

9. A method comprising utilizing a laminated glass pane according to claim 1 in a vehicle or a building or in an information display.

10. Method for producing a laminated glass pane according to claim 1, comprising:
obtaining a first glass layer and a second glass layer,
obtaining a first inlet film having a first electrically conducting structure and a second inlet film having a second electrically conducting structure,
arranging the first inlet film relative to the first glass layer such that the first electrically conducting structure is closer to the first glass layer,
arranging the second inlet film relative to the first glass layer such that the second electrically conducting structure is closer to the second glass layer,
bonding the arranged first and second glass layers and the first and second inlet films under the influence of heat.

11. Method for producing a laminated glass pane according to claim 7, comprising:
obtaining a first glass layer and a second glass layer,
obtaining an inlet film having a first electrically conducting structure and a second electrically conducting structure,
folding the inlet film such that the first electrically conducting structure and the second electrically conducting structure at least partially overlap one another,
arranging the inlet film relative to the first glass layer such that the first electrically conducting structure is closer to the first glass layer and the second electrically conducting structure is closer to the second glass layer,
bonding the arranged first and second glass layers and inlet film under the influence of heat.

12. Method for producing a laminated glass pane according to claim 8, comprising:
obtaining a first glass layer and a second glass layer,
structuring a first electrically conducting structure on the first glass layer and a second electrically conducting structure on the second glass layer,
arranging the first glass layer such that the first electrically conducting structure is closer to the first glass layer and the second electrically conducting structure is closer to the second glass layer,
bonding the arranged first and second layers and the first and second electrically conducting structures under the influence of heat.

13. The method according to claim 10, further comprising arranging at least one combination film between the first glass layer and the second glass layer, before the arranged first and second glass layers and first and second inlet films are bonded under the influence of heat.

* * * * *